United States Patent
Cariou et al.

(10) Patent No.: US 10,757,674 B2
(45) Date of Patent: *Aug. 25, 2020

(54) ENHANCED LOCATION DETERMINATION OF WIRELESS DEVICES

(71) Applicant: Intel IP Corporation, Santa Clara, CA (US)

(72) Inventors: Laurent Cariou, Portland, OR (US); Jonathan Segev, Tel Mond (IL)

(73) Assignee: Intel IP Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/522,330

(22) Filed: Jul. 25, 2019

(65) Prior Publication Data

US 2020/0163039 A1 May 21, 2020

Related U.S. Application Data

(63) Continuation of application No. 15/681,913, filed on Aug. 21, 2017, now Pat. No. 10,368,332.

(60) Provisional application No. 62/377,890, filed on Aug. 22, 2016.

(51) Int. Cl.
*H04W 84/12* (2009.01)
*H04W 8/24* (2009.01)
*H04W 64/00* (2009.01)

(52) U.S. Cl.
CPC ............ *H04W 64/00* (2013.01); *H04W 8/24* (2013.01); *H04W 84/12* (2013.01)

(58) Field of Classification Search
CPC ........ H04W 64/00; H04W 8/24; H04W 84/12
USPC ...................................................... 455/456.5
See application file for complete search history.

(56) References Cited

U.S. PATENT DOCUMENTS

| | | | | |
|---|---|---|---|---|
| 2014/0315572 | A1* | 10/2014 | Hsu ........................ | G01S 5/10 455/456.1 |
| 2016/0021495 | A1* | 1/2016 | Segev .................. | H04W 40/20 455/456.3 |
| 2016/0316472 | A1* | 10/2016 | Kwon .................. | H04L 5/0055 |
| 2017/0202026 | A1* | 7/2017 | Ahn .................. | H04W 72/0413 |

* cited by examiner

*Primary Examiner* — William Nealon
(74) *Attorney, Agent, or Firm* — Eversheds Sutherland (US) LLP

(57) ABSTRACT

This disclosure describes systems, methods, and devices related to enhanced location determination. A device may cause to exchange one or more capabilities information with one or more station devices. The device may cause to assign one or more unassociated identifications (UIDs) to one or more unassociated station devices of the one or more station devices to participate in location determination of the one or more unassociated station devices. The device may cause to send a trigger frame comprising at least one of the one or more UIDs; wherein the trigger frame contains one or more resource assignments. The device may identify one or more sounding information from at least one of the one or more station devices.

20 Claims, 10 Drawing Sheets

ENHANCED LOCATION DETERMINATION OF WIRELESS DEVICES

CROSS-REFERENCE TO RELATED APPLICATION(S)

This application is a continuation of U.S. Non-provisional application Ser. No. 15/681,913 filed Aug. 21, 2017, which claims the benefit of U.S. Provisional Application 62/377,890, filed Aug. 22, 2016, the disclosures of which are incorporated herein by reference as if set forth in full.

TECHNICAL FIELD

This disclosure generally relates to systems and methods for wireless communications and, more particularly, to enhanced location determination of wireless devices.

BACKGROUND

Wireless devices are becoming widely prevalent and are increasingly requesting a determination of their locations. For example, wireless devices inside a location such as a mall, airport or other locations may request a determination of their locations from control devices such as access points (APs). Typically, communications with at least three APs are needed to determine a location of a wireless device.

DETAILED DESCRIPTION

Figure 1:
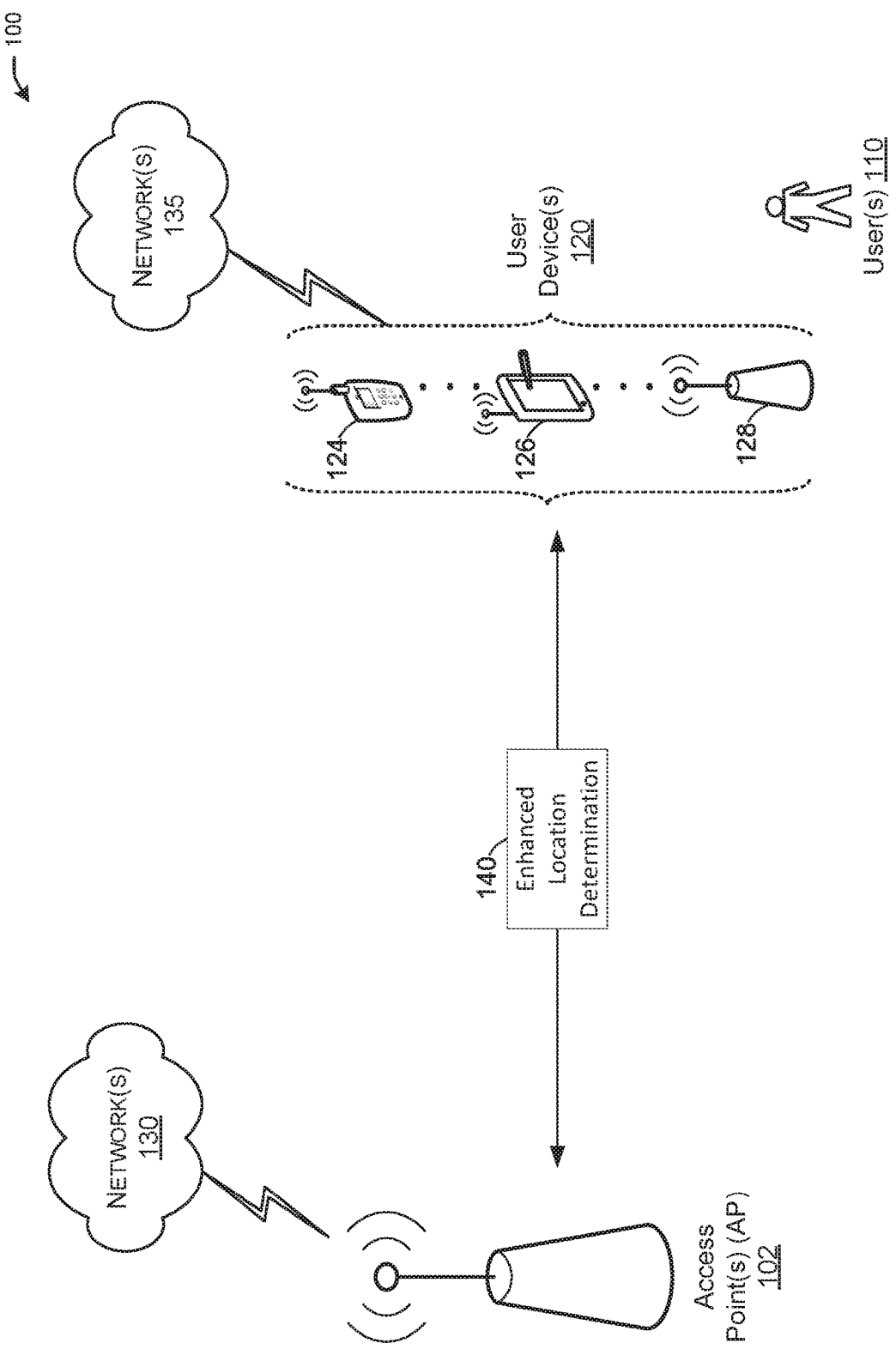
FIG. 1 depicts a network diagram illustrating an example network environment of an enhanced location determination, in accordance with one or more example embodiments of the present disclosure.

Example embodiments described herein provide certain systems, methods, and devices for enhanced location determination, including, but not limited to, the IEEE 802.11 family of standards.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A Wi-Fi device may perform a timing measurement procedure, known as fine timing measurement (FTM), in order to allow the Wi-Fi device to obtain its range to another device, such as an access point or an FTM responder. The FTM procedure is an IEEE 802.11 protocol introduced to support location determination based on range measurement to multiple known responding devices and execution of location determination techniques, for example, triangulation, trilateration, etc. FTM operates in both the associated and unassociated mode. REVmc protocol is defined for both very high throughput (VHT) (e.g., IEEE 802.11ac) and high throughput (HT) (e.g., IEEE 802.1 in) station devices (STAs) but is essentially a single input single output (SISO) protocol using pre-VHT compatible format acknowledgment (ACK) (e.g., non-HT duplicate ACK) and one transmit chain for each measurement.

Typically, channel sounding is associated with beamforming, which depends on channel calibration procedures to determine how to radiate energy in a preferred direction.

A variant of the VHT sounding protocol may include an enhanced FTM request. However, with the introduction of high efficiency multi-user (HE MU) as one of the predominant modes, the resulting scheduling mechanism in which free access to the channel gets lower probability, which gets even lower the more the medium becomes congested. For example, operation under HE MU may require an assignment of an identifier called association identification (AID) which is assigned during association with an access point (AP), while the positioning protocol is required to operate in both the associated and the unassociated modes. For correct execution of positioning measurements, the FTM protocol has capabilities, which are not supported (e.g., location information (LCI) information, supported BWs, etc.).

When the AP sends the trigger frame to one or more STAs, the trigger frame contains the AIDs that identify the STAs. When the STA sees a trigger frame with its AID in it, the STA then determines that it is triggered by the AP. However, the AID is assigned by the AP to associated STAs and not unassociated STAs. Therefore, a mechanism that uses a trigger frame in order to perform location measurement may not work for unassociated STAs.

Example embodiments of the present disclosure relate to systems, methods, and devices for enhanced location determination.

In one embodiment, an enhanced location determination system may facilitate operation under HE MU for 802.11az positioning using an enhanced sounding protocol. The enhanced sounding protocol may allow for associated and unassociated devices to be triggered by an AP to perform a location determination. Typically, an STA needs to perform an FTM procedure with three separate APs in order to determine its location using triangulation, trilateration, etc. This type of location determination requires the STA to communicate using a SISO protocol with one AP. That is, the STA has to initiate separate communications with three different APs in order to determine its location.

In one embodiment, an enhanced location determination system may facilitate that an AP may take control of the communication medium using a transmit opportunity (TXOP). The AP may then send a trigger frame instructing one or more STAs to collect sounding information. In effect, the AP triggers one or more simultaneous responses from the one or more STAs. The AP may then detect and process these responses. In an uplink sounding part, the trigger frame may provide one or more resource allocations for the STAs to send their uplink sounding information. The STAs will then send a known sequence so that the AP can estimate, for example, the time it receives the uplink data with the sounding information from the STAs. In a downlink sounding part, the AP will send a known sequence to the STAs in order for them to estimate the time they receive the communication from the AP. Following the UL sounding part and the DL sounding part, the AP and the STAs will exchange additional messaging to determine the location of the STAs. During the sounding parts, the AP sends the trigger frame and stores in its memory when it sent the trigger frame. When the AP sends a packet in the downlink direction during the DL sounding part or other parts, the AP stores the time it sends each of these packets. It also records and stores the time it receives a packet from each of the STAs. A similar process happens at each STA, where the STA would store in its own memory timing information of packets sent and received to and from the AP.

In one embodiment, an enhanced location determination system may have a negotiation phase and a location measurement phase. In the negotiation phase, an AP and an STA may exchange the capabilities associated with a location determination.

In one embodiment, an enhanced location determination system may facilitate adding a one-time resource assignment and capability exchange phase by: 1) extending a positioning negotiation phase to allow an AP to assign to an STA a unique unassociated identification (UID) and a short feedback allocation ID by extending the legacy FTM request and response process; and 2) enabling the capability as well as location information (LCI) exchange between the user device and the AP, by extending the existing FTM negotiation mechanism.

In one embodiment, the enhanced location determination system may provide scheduling information of positioning measurement opportunities from the AP to the STA by first indicating, in the FTM response, the scheduling of the short feedback dedicated for positioning the STA to make its request, and second by using the short feedback trigger frame to indicate future opportunities.

In another embodiment, the enhanced location determination system may add a mechanism for resource release based on a keep-alive method.

Some of the advantages of the enhanced location determination system may be that existing solutions require capability exchange and resource assignment on each location measurement. This results in both medium and power deterioration as the capabilities rarely or never change, and the extended time on channel impacts the user experience in cases where the user device is associated to another AP (on another channel). Further, the enhanced location determination system supports the use of the short feedback allocation (UID and the orthogonal allocation ID) for the unassociated mode, which is a more efficient allocation method for unscheduled resource allocation. The location determination system may allow the user device to choose (non-deterministic) from a set of opportunities (short feedback) such that the user device can comply with all of its other scheduling limitations (e.g., due to association, other positioning measurements). Further, the enhanced location determination system does not require signaling for resource release, as the link budget of at least some of the AP that the user device is measuring towards may not be reliable.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment of location determination, according to some example embodiments of the present disclosure. Wireless network 100 may include one or more user devices 120 and one or more responding device(s) (e.g., AP 102), which may communicate in accordance with IEEE 802.11 communication standards. The user device(s) 120 may be mobile devices that are non-stationary (e.g., not having fixed locations) or may be stationary devices.

Figure 7:
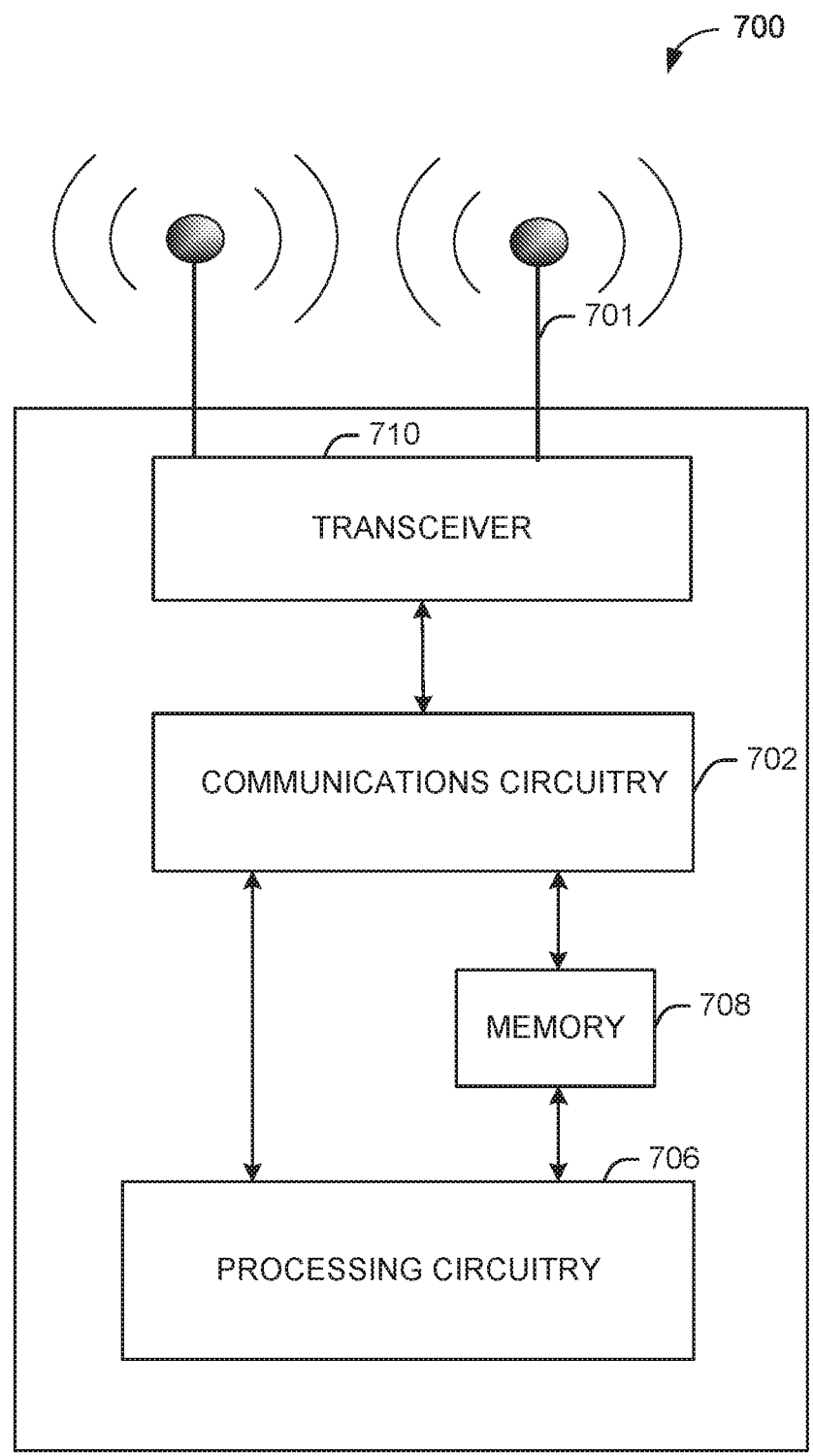
FIG. 7 depicts a functional diagram of an example communication station that may be suitable for use as a user device, in accordance with one or more example embodiments of the present disclosure.
Figure 8:
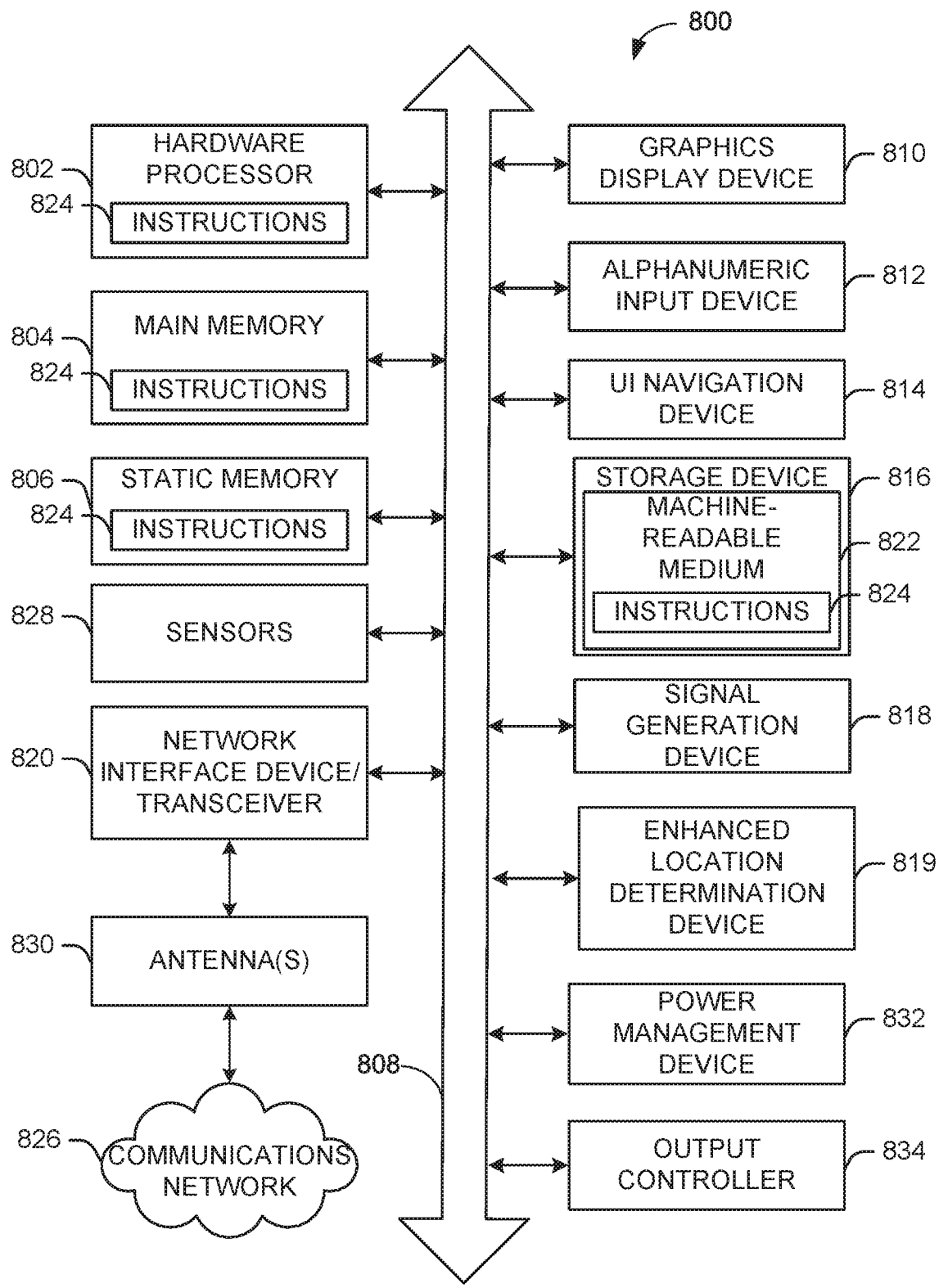
FIG. 8 depicts a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 7 and/or the example machine/system of FIG. 8.

One or more illustrative user device(s) 120 and/or AP 102 may be operable by one or more user(s) 110. The user device(s) 120 (e.g., 124, 126, or 128) and/or AP 102 may include any suitable processor-driven device including, but not limited to, a mobile device or a non-mobile, (e.g., a static), device. The AP 102 may be able to determine if any of the user devices 120 are associated with the AP or if any of the user devices 120 are an unassociated user device. An associated device is a device that is known to the AP 102 and an unassociated device is a user device unknown to the AP 102. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc., may also be included in this list.

Any of the user device(s) 120 (e.g., user devices 124, 126, 128), and AP 102 may be configured to communicate with each other via one or more communications networks 130 and/or 135 wirelessly or wired. The user device(s) 120 may also communicate peer-to-peer or directly with each other with or without the AP 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP 102.

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When an AP (e.g., AP 102) establishes communication with one or more user devices 120 (e.g., user devices 124, 126, and/or 128), the AP 102 may communicate in a downlink direction and the user devices 120 may communicate with the AP 102 in an uplink direction by sending data frames in either direction. The user devices 120 may also communicate peer-to-peer or directly with each other with or without the AP 102.

Typically, sounding is used to estimate a channel between devices. For example, in order for an AP and user devices to perform sounding, the AP initiates a frame exchange to the user devices. It begins by exchanging frames to measure the channel. The result of the channel measurement is a derivation of the steering matrix, which is a mathematical description of how to direct transmitted energy toward the receiver. The steering matrix is applied to the transmit signal to optimize reception at one or more receivers. Here, sounding is used to estimate the time of the line of sight path between the AP and each of the user devices (associated or unassociated).

User devices can associate or otherwise register with an AP to gain access to the network. Association allows the AP to record each user device so that frames are properly delivered. Association occurs on wireless infrastructure networks. Typically, a user device can only associate with one AP at a time. When a user device associates with an AP, the AP assigns an AID to the user device in order to properly communicate with each other.

In one embodiment, and with reference to FIG. 1, a user device 120 may perform enhanced location determination 140 with an AP 102. User device 120 may be considered as an initiating device, also referred to as a station device (STA), and the AP 102 may be considered as a responding device.

During a communication between AP 102 and one or more user devices 120, the one or more user devices 120 may be associated or unassociated with the AP 102. The one or more user devices 120 may initiate a location initiation procedure in order to perform location determination.

With reference to FIG. 1, the one or more user devices 120 and/or the AP 102 may perform a location negotiation procedure. The location negotiation procedure may, for example, determine the location of an initiating device (e.g., the user devices 120 or STA). In the case where the one or more user devices 120 are unassociated with the AP 102, two phases for the location negotiation procedure may be defined. The first phase may consist of capability exchange and preliminary positioning agreement negotiation between the unassociated user device 120 and AP 102, through exchange of FTM request and response frames for instance. The second phase consists of the positioning measurement phase. This phase consists in actually allowing multiple user devices 120 to perform positioning measurements. It is understood that the above descriptions are for purposes of illustration and are not meant to be limiting.

Figure 2:
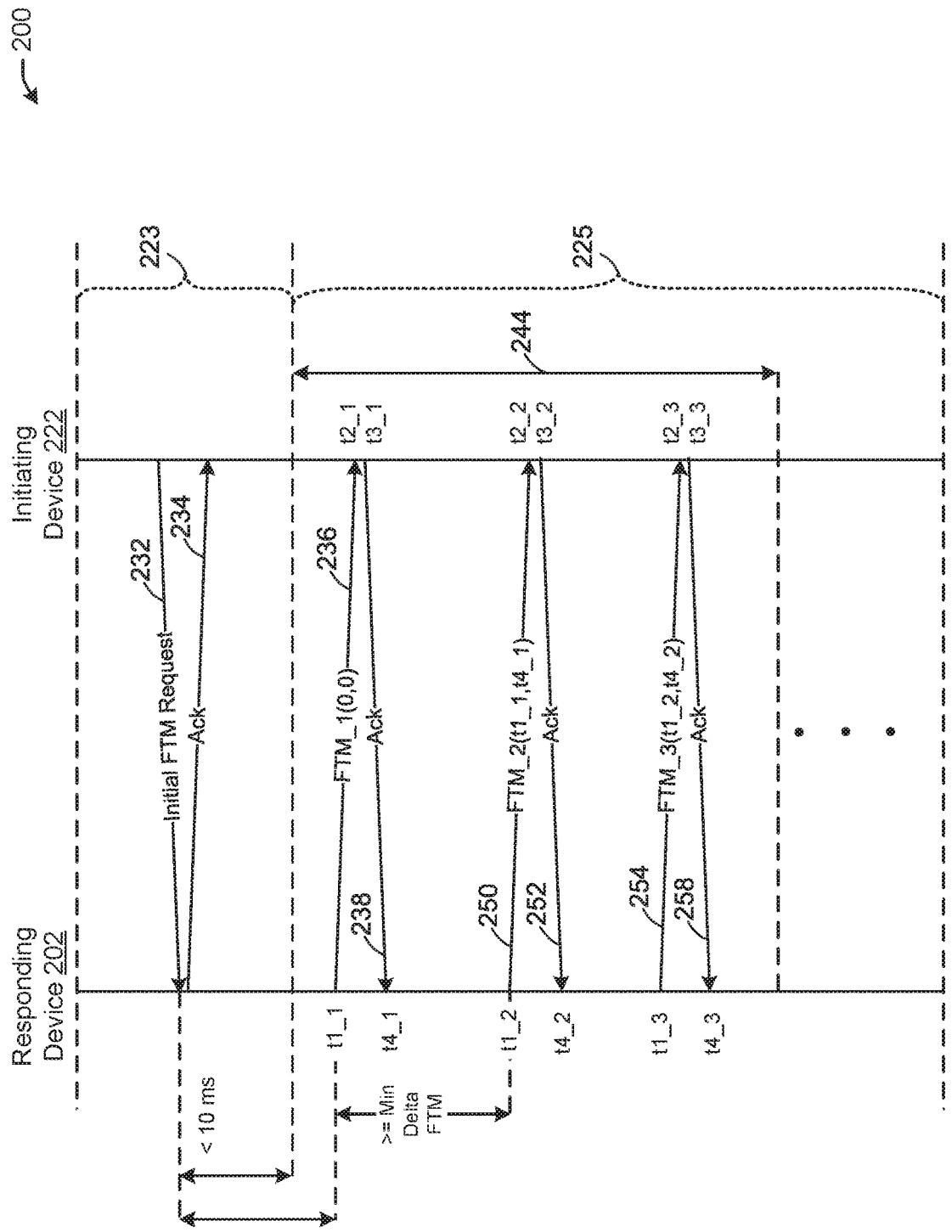
FIG. 2 depicts an illustrative flow diagram for location determination using fine timing measurement (FTM).

FIG. 2 depicts an illustrative flow diagram for an example negotiation and location measurement phases using FTM for a single burst instance and three FTMs per burst. It is understood that this is only an example meant for illustrative purposes.

With reference to FIG. 2, there is shown an initiating device 222 and a responding device 202. The initiating device 222 and the responding device 202 may be involved in an FTM procedure in order for the initiating device 222 to determine its location. The FTM procedure may be composed of one or more phases, for example, a negotiation phase 223 and a location measurement phase 225. The negotiation phase 223 is an exchange of capabilities (e.g., number of supported transmit (TX) chains, number of supported receive (RX) chains, supported bandwidths, etc.) together with legacy capabilities (e.g., FTM parameters, location configuration information (LCI) request indication, etc.). Typically, there is one negotiation phase and multiple measurement phases in order to determine the location of an STA.

When performing the FTM procedure, the initiating device 222 may start the FTM procedure by sending an initial FTM request 232 to the responding device 202. The responding device 202 may send an acknowledgment (e.g., ACK 234) to the initiating device 222. At a time instance t1_1, the responding device 202 may send the first FTM frame 236 to the initiating device 222. When the initiating device 222 receives the first FTM frame 236, the initiating device 222 will process the first FTM frame 236. Each time the initiating device 222 receives an FTM frame from the responding device 202, the initiating device 222 may send an acknowledgment (e.g., ACK 238) in response to the received FTM frame (e.g., FTM frame 236). The ACK 238 may be received by the responding device 202 at time t4_1. The initiating device 222 and the responding device 202 may perform the FTM messaging in order to take time measurements within a burst duration 244. The responding device 202, at time t1_2 may send the second FTM frame 250. At time t2_2, the initiating device 222 may receive the second FTM frame 250. After a processing delay, at time t3_2, the initiating device 222 may send an ACK 252 to the responding device 202. The ACK 252 may be received by the responding device 202 at time t4_2. The responding device 202 may send a third FTM frame 254 at time t1_3 to the initiating device 222. The time duration 356 from time t1_2 to time t1_3 indicates the time duration between two consecutive FTM frames (e.g., the second FTM frame 250 and the third FTM frame 254). The third FTM frame 254 may be received by the initiating device 222 at time t2_3, and the initiating device 222 may respond by sending ACK 258 at time t3_3. The ACK 258 may be received by the responding device 202 at time t4_3.

One or more problems associated with the exemplary measurement of FIG. 2 may exist. For example, the FTM protocol shown operates in both the associated and unassociated mode. However, this FTM protocol is mostly a single input single output (SISO) protocol. That is, the FTM protocol is between a responding device (e.g., responding device 202) and an initiating device (e.g., initiating device 222). Consequently, MIMO adaptation may be necessary in order to be consistent with the medium access methods of IEEE 802.1 lax, which is expected to be the 802.11 technology of choice when IEEE 802.11az based products are available to the market.

Figure 3:
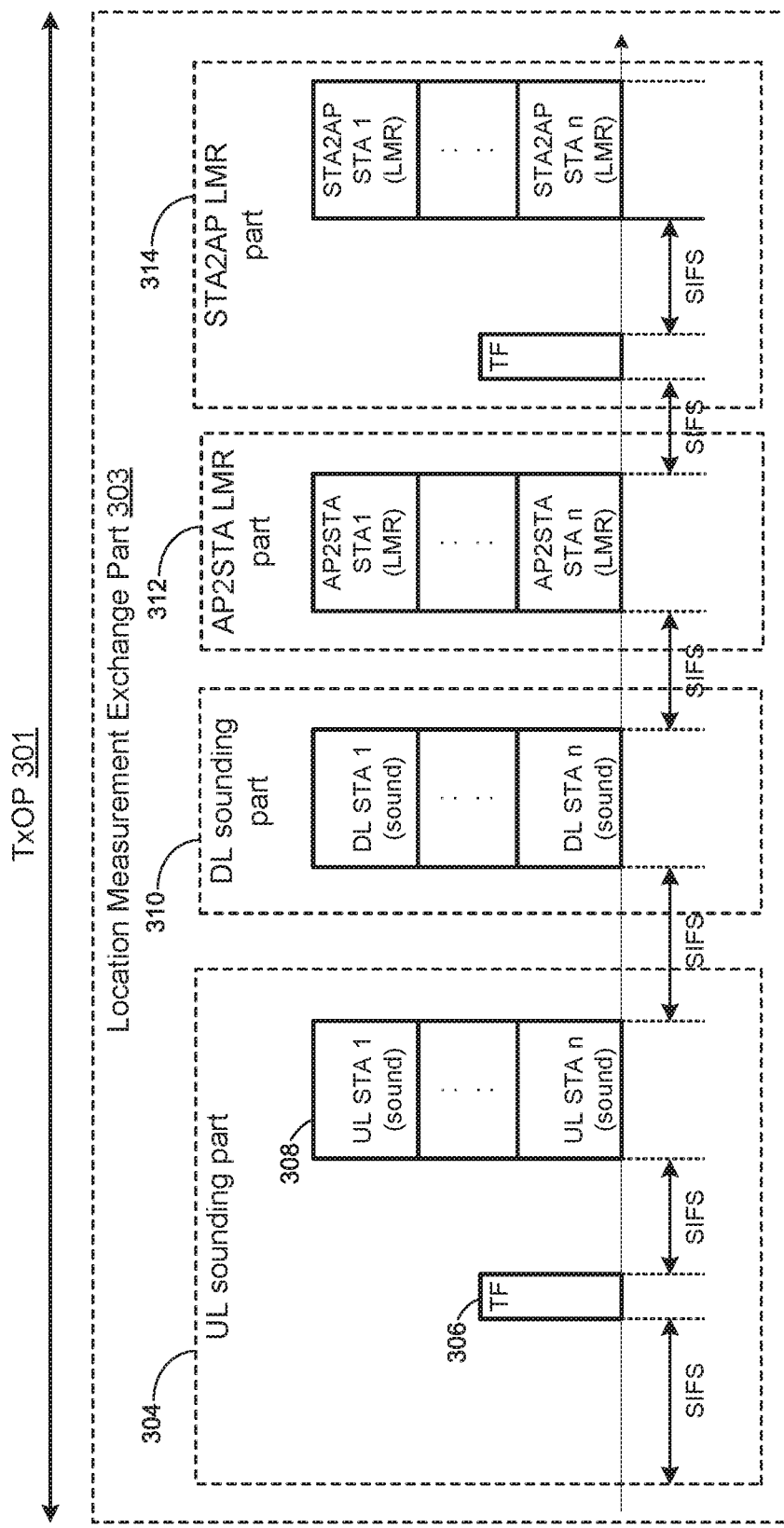
FIG. 3 depicts an illustrative flow diagram of a location measurement exchange between an initiating device and a responding device in high efficiency multiuser (HE MU), in accordance with one or more example embodiments of the present disclosure.

FIG. 3 depicts an illustrative flow diagram of a location measurement exchange between an initiating device and a responding device in high efficiency multiuser (HE MU).

Referring to FIG. 3, there is shown a location measurement exchange part 303 that is implemented between an AP and multiple STAs in order to determine the locations of the one or more STAs. This location measurement exchange part 303 may be done multiple times between the AP and the one or more STAs. The AP may take control of the communication medium using a transmit opportunity (TXOP) 301. The AP may then send a trigger frame during an uplink (UL) sounding part 304 instructing one or more STAs to collect sounding information. For example, an AP may send a trigger frame 306 after a short inter-frame space (SIFS) time to one or more STAs. In effect, the AP triggers one or more simultaneous responses from the one or more STAs. The AP may then detect and process these responses. In an uplink sounding part, the trigger frame 306 may provide one or more uplink resource allocations 308 for the STAs to send their uplink sounding information. The STAs (e.g., STA 1, . . . n, where n is a positive integer) will then send a known sequence so that the AP can estimate, for example, the time it receives the uplink data with the sounding information from the STAs. In a DL sounding part 310, the AP may send a known sequence to the STAs in order for them to estimate the time they receive the communications from the AP. During the sounding parts (e.g., UL sounding part 304 and the DL sounding part 310), the AP sends the trigger frame and stores in its memory the time it sent the trigger frame. When the AP sends a packet in the downlink direction during the downlink sounding part or other parts, the AP stores the time it sends each of these packets. It also records and stores the time it receives a packet from each of the STAs. A similar process happens at each STA, where the STA would store in its own memory timing information of packets sent and received to and from the AP. Following the UL sounding part and the DL sounding part, the AP and the STAs may exchange additional messaging to determine the location of the STAs. For example, there may be location measurement report (LMR) parts from the AP to the STA (AP2STA LMR part 312) and from the STA to the AP (STA2AP LMR part 314). During those parts, the AP and the STAs exchange reports that include recorded timing information associated with the UL and DL sounding parts.

With reference to FIG. 3, one or more problems may exist. For example, operation under HE MU may require an assignment of an identifier called Association ID (AID), which is assigned during association, while the positioning protocol is required to operate in both the associated and the unassociated modes. For correct execution of positioning measurements, the FTM protocol has capabilities that are not supported by the scheme in FIG. 3 (e.g., location configuration information (LCI), supported bandwidths (BWs)). Although the REVmc protocol supports scheduling and availability information to STA and AP, the scheme of FIG. 3 is short of doing so, requiring the STA to be available for long periods of time. It is understood that the above descriptions are for purposes of illustration and are not meant to be limiting.

Figure 4:
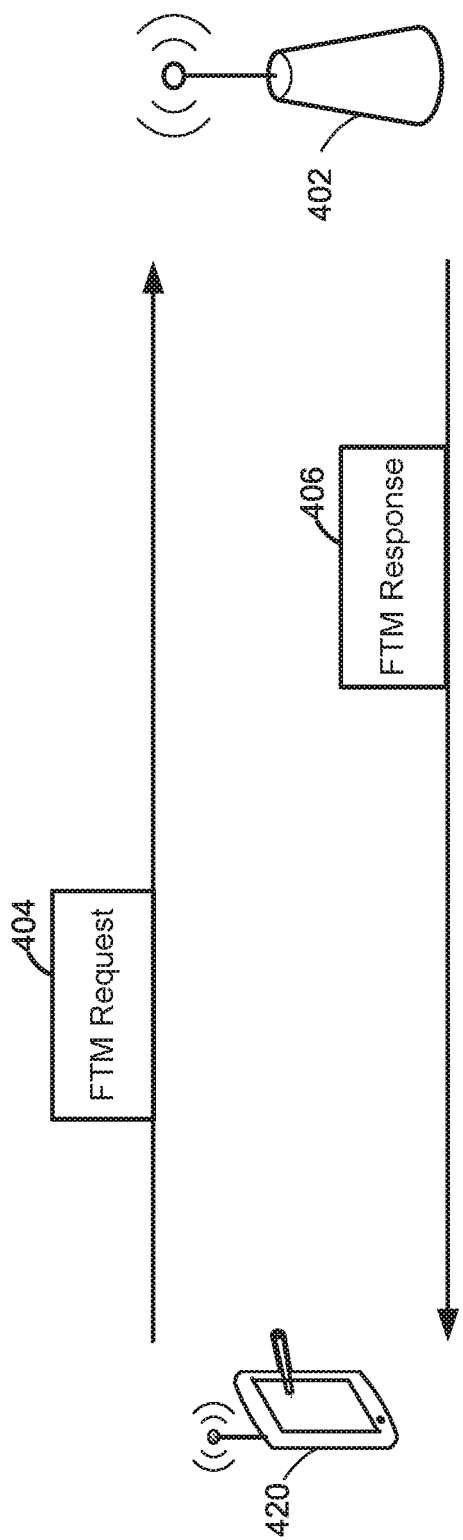
FIG. 4 depicts an illustrative first phase of an enhanced location determination system, in accordance with one or more example embodiments of the present disclosure.

FIG. 4 depicts an illustrative first phase of an enhanced location determination system, in accordance with one or more example embodiments of the present disclosure.

Referring to FIG. 4, there is shown a user device 420 and an AP 402, where the user device 420 and the AP 402 may be involved in a capability negotiation, a resource assignment phase, an opportunistic scheduling information process, and location determination. The user device 420 may be an unassociated user device or an associated user device.

In one embodiment, an enhanced location determination system may facilitate a first phase, which may consist of capability exchange and preliminary positioning agreement negotiation between the user device 420 and the AP 402, through exchange of FTM request and response frames for instance.

In case the user device 420 is an unassociated device, during the first phase, the user device 420 may be allocated a unique UID, and/or a unique short_feedback_allocationID (for short resource request), which is valid for a specific keep-alive timeout duration. For example, the FTM request 404 may be sent from the user device 420 to the AP 402. The AP 402 may respond with an FTM response 406. The FTM response 406 may include UID and orthogonal allocation ID, which may be used for short resource requests. The UID may be valid for a time duration that may be determined by the AP 402 or by the enhanced location determination system. For example, if the user device 420 does not participate in the measurement phase, a timeout may occur and the UID will be released and reassigned.

In addition, the AP 402 may indicate its positioning capabilities and scheduling information about the positioning measurements phases (target time for these phases). The user device 420 may indicate its positioning capabilities and needs. The AP 402 and the user device 420 eventually may reach an agreement on how the user device 420 will participate in positioning measurement phases (in a scheduled or unscheduled manner). For scheduled mode, target wake time (TWT) procedure can be used.

For example, if the user device 420 is in a shopping mall and wants to do a location determination, the user device 420 may need to determine three or more APs and its vicinity that are capable of performing location measurements. The user device 420 may be associated with one AP and may need to determine other APs to complete the location determination. The user device 420 may scan for APs capable of performing location measurements. In order to perform the location determination, the user device 420 may enter into a negotiation phase. In the negotiation phase, the user device 420 communicates with the AP and initiates an FTM request (e.g., FTM request 404). The AP 402 responding with the FTM response 406, may include, in addition to the above information, a timing of when the AP 402 is going to perform the location measurements (of FIG. 3) and at what frequency. For example, the AP 402 may indicate in the FTM response 406 that a trigger frame will be sent at a certain time in order to initiate the resource allocations for the location measurements and also may indicate that this will happen at a certain frequency. This may assist the user devices to schedule their wake-up times if necessary. Once an agreement is reached between the user device 420 and the AP 402, then the location measurements may be performed with that AP. The same process would then occur between the user device 420 and other APs.

In one embodiment, an enhanced location determination system may facilitate that one AP (e.g., the AP 402) may communicate with one or more user devices in order to participate in a multiuser location determination. For example, the AP 402 may communicate with one or more user devices that are either associated or unassociated with this AP 402. The AP will start the multiuser communication by assigning AIDs to the associated user devices and UIDs to the unassociated user devices. The UIDs will be different from the AIDs so that there is no overlap or collision in ID assignments. When the AP 402 sends a trigger frame to the multiuser group of user devices, the AP is in effect instructing or triggering the user devices such that if a user device receives a UID in the trigger frame, which means that the AP wants to perform location measurements with that user device. This also means that this user device is scheduled with resource allocation in order for the user device to send its uplink data during the measurement phase.

It is understood that the above descriptions are for purposes of illustration and are not meant to be limiting.

Figure 5A:
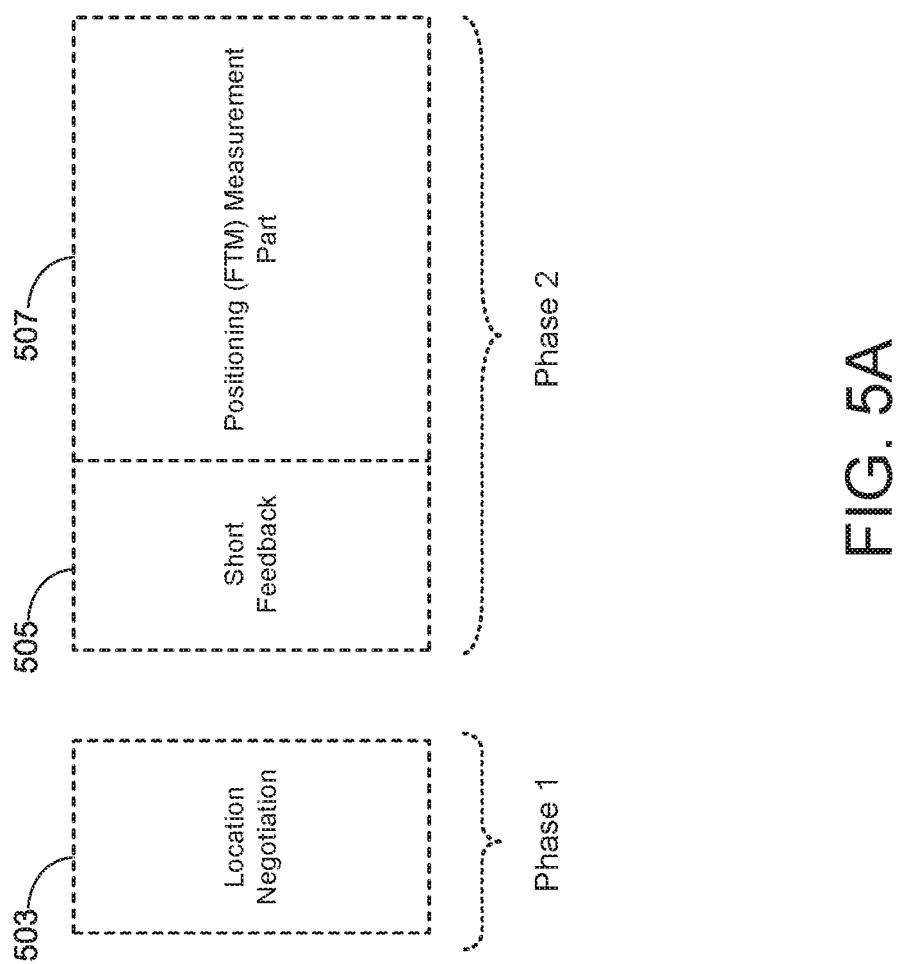
FIG. 5A depicts an illustrative enhanced location determination system, in accordance with one or more example embodiments of the present disclosure.

FIG. 5A depicts an illustrative enhanced location determination system, in accordance with one or more example embodiments of the present disclosure.

In this example, an enhanced location determination system may utilize two phases. Phase 1, which may include location negotiation and UID assignment. Phase 2 may include a short location resource request to identify the STAs that want to participate in positioning measurement part. Further, phase 2 may include a positioning (FTM) measurement part that may be for STAs identified in the short location resource request just before.

Phase 1 may be for negotiation of positioning service parameters and the phase 2 may be for positioning measurements.

In one embodiment, as part of the negotiation, the AP may provide the STA a UID and/or a short_feedback_allocatioID, if the STA is an unassociated STA.

In one embodiment, the UID and short_feedback_allocationID assignment can expire after a keep-alive timeout. The AP may define the original value of this timeout. This timeout is reset every time the AP and STA have a successful frame exchange. In another embodiment, a timer is started whenever the UID is assigned to an STA. The timer may then be compared by the AP to a UID threshold. When the timer is greater or equal to the UID threshold, the UID may be considered as expired and the AP may reclaim it. In that case, the AP may re-assign that UID to another STA, or to the same STA.

In one embodiment, as part of the negotiation, the STA may have its phase 2 measurements scheduled at specific target times, or can participate in phase 2 in an unsynchronized manner.

The second phase (positioning measurement phase) may be preceded by a short resource request phase 505, where the AP offers the opportunity to STAs that completed the first phase 503 to indicate that they are available and willing to participate in the positioning measurement phase. The STAs may have used their valid short_feedback_allocationID in this short resource request. The AP may then schedule the STAs that indicated that they are available for the measurement phase 507, by using their UID/AID in the trigger frame that triggers that phase.

The second phase may be scheduled at regular specific target times that may be indicated to the STA in phase 1, in beacons, or in the trigger frame in phase 2. It is understood that the above descriptions are for purposes of illustration and are not meant to be limiting.

Figure 5B:
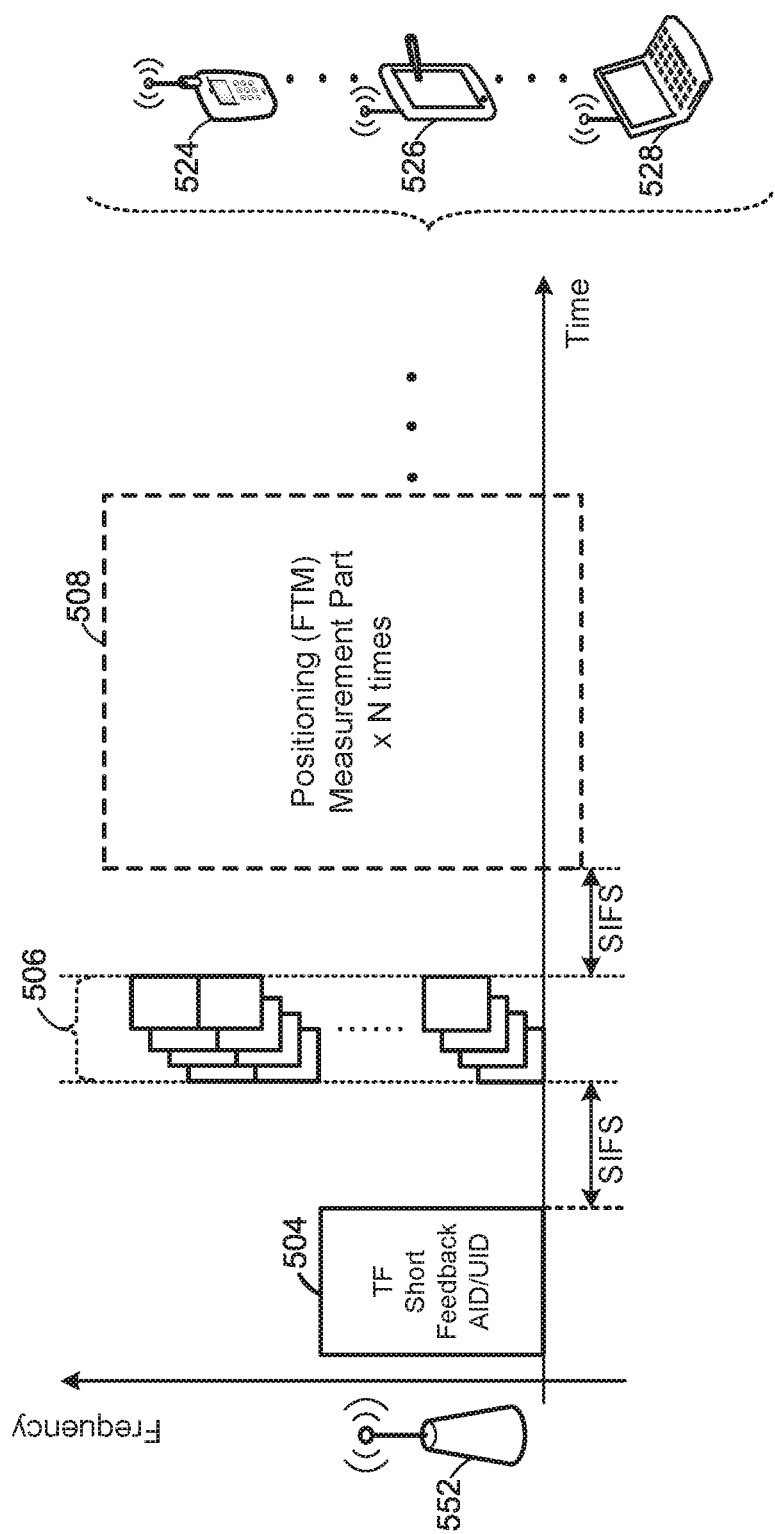
FIG. 5B depicts an illustrative second phase of an enhanced location determination system, in accordance with one or more example embodiments of the present disclosure.

FIG. 5B depicts an illustrative phase 2 of the enhanced location determination system, in accordance with one or more example embodiments of the present disclosure.

Referring to FIG. 5B, there is shown an example of phase 2 of FIG. 5A showing one or more positioning measurements between an AP 552 and multiple user devices (e.g., user devices 524, 526, and 528) after the completion of phase 1 of FIG. 5A.

In this example, phase 2 may allow multiple user devices to perform positioning measurements with an AP. For example, there may be a trigger frame for short feedback that may be sent from the AP 552 to the multiple user devices.

In one embodiment, a short feedback allocation mechanism is a new mechanism for an AP (e.g., AP 552) to collect short feedbacks from the multiple user devices in a multiuser scenario by using a PHY payload instead of a MAC payload. For example, the AP 552 may send a trigger frame 504 to user devices 524, 526, and 528 assigning them one or more resource units so that they can send their uplink data. Instead of using these one or more resource units which may be allocated for the user devices and in case there are many user devices, it may be more beneficial and efficient to use a short feedback mechanism which may use a small number of bits to feedback to the AP 552. In other words, in response to the trigger frame 504, each user devices are able to send a signal in the form of energy on a very small and short allocation using PHY payload instead of a MAC payload. For example, the user devices 524, 526, and 528 may use resource allocations to send feedback as to whether these user devices are willing to participate in the positioning measurement part 508. The positioning measurement part 508 may be performed N times, where N and is a positive integer.

The short feedback allocation mechanism may be used in order to determine the user devices that are available for location measurements with the AP 552. When the AP 552 schedules a multiuser positioning measurement, the AP 552 does not know which user device is going to be available for the location measurement, especially with unassociated user devices. The AP may send a specific trigger frame for short feedback with the resource request mechanism for location services, where the AP 552 communicates with the associated and unassociated user devices that indicated in the negotiation stage (e.g., phase 1 of FIG. 5A) that they are willing to do location measurements. All the user devices that received this specific trigger frame 504 and are able to participate in the location measurements may respond to the AP 552 using a very short indication (e.g., using the short feedback allocation mechanism), which may be, as explained above, a signal in the form of energy to the channel. Based on that, the AP 552 will then trigger the location measurement phase with the user devices that have indicated, using the short feedback mechanism, that they are available for location measurements.

There may be two modes of operation: a scheduled mode and an unscheduled mode. In one embodiment, in the scheduled mode, if the user device and the AP agreed in phase 1 of FIG. 5A that the user device will participate in a specific TXOP for positioning measurement (e.g., positioning TWT service period), the AP may trigger that user device at the beginning of this TXOP.

In another embodiment, in the unscheduled mode, if the user device and AP agreed that the user device can participate in any TXOP for positioning measurement, then the AP may start the TXOP for the positioning measurement by sending a trigger for short resource request for positioning service. The user devices that want to participate in the positioning measurement TXOP responds to the trigger using short resource request feedback, using their assigned short_feedback_allocationID given by the AP in phase 1. The AP then identifies that user device and allocates UL and DL resources for the positioning measurement part. It is understood that the above descriptions are for purposes of illustration and are not meant to be limiting.

Figure 6A:
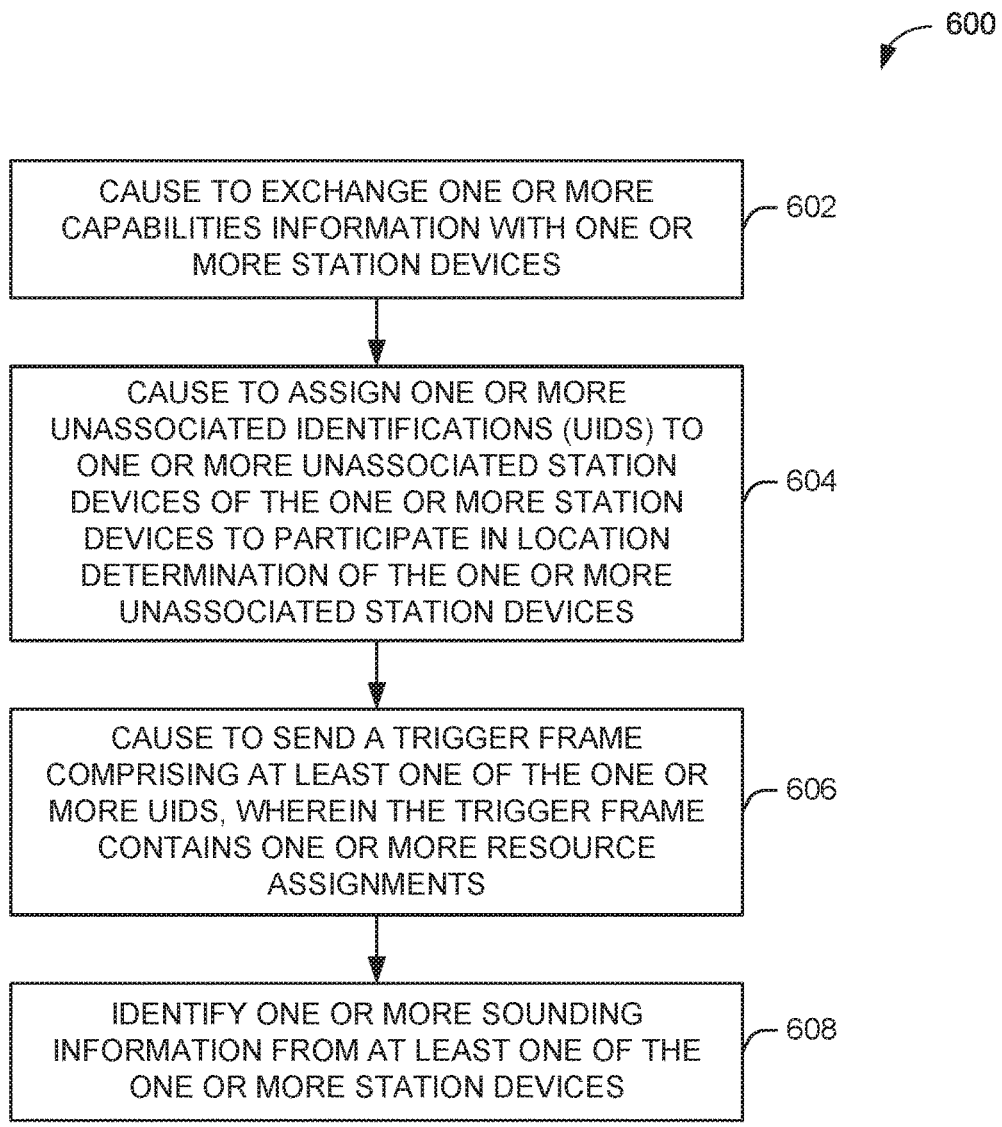
FIG. 6A depicts a flow diagram of an illustrative process for enhanced location determination system, in accordance with one or more example embodiments of the present disclosure.

FIG. 6A illustrates a flow diagram of process 600 for location determination, in accordance with one or more example embodiments of the present disclosure.

At block 602, a device (e.g., the AP 102 of FIG. 1) may cause to exchange one or more capabilities information with one or more station devices (e.g., the user device(s) 120 of FIG. 1). For example, the AP 102 and one or more user devices 120 of FIG. 1, may participate in a capability exchange phase. The capability exchange may also include a preliminary positioning agreement negotiation between the user devices 120 and AP 102, through exchange of FTM Request and Response frames for instance. The user devices 120 may be associated or unassociated devices with the AP 102. The one or more capabilities information may include a location configuration information (LCI), a number of supported transmit (TX) chains, a number of supported receive (RX) chains, or supported bandwidths. A sounding protocol may allow for associated and unassociated devices to be triggered by an AP to perform a location determination. Typically, an STA needs to perform an FTM procedure with three separate APs in order to determine its location using triangulation, trilateration, etc. This type of location determination requires the STA to communicate using a SISO protocol with one AP. That is, the STA has to initiate separate communications with three different APs in order to determine its location.

At block 604, the device may cause to assign one or more unassociated identifications (UIDs) to one or more unassociated station devices of the one or more station devices to participate in location determination of the one or more unassociated station devices. For example, the AP 102 to assign to user device 120 a unique UID (unassociated ID) and a short feedback allocation ID by extending the legacy FTM request and response process. The AP 102 may add a mechanism for resource release based on a keep-alive method. The UID may be valid for a time duration that may be determined by the AP 102. For example, if the user device 120 does not participate in the measurement phase, a timeout may occur and the UID will be released and reassigned by the AP 102.

At block 606, the device may cause to send a trigger frame comprising at least one of the one or more UIDs; wherein the trigger frame contains one or more resource assignments. When the AP 102 sends a trigger frame to the multiuser group of user devices, the AP 102 is in effect instructing or triggering the user devices 120 such that if a user device 120 receives a UID in the trigger frame, this means that the AP 102 wants to perform location measurements with that user device 120. This also means that this user device is scheduled with resource allocation in order for the user device 120 to send its uplink data during the measurement phase.

At block 608, the device may identify one or more sounding information from at least one of the one or more station devices. For example, the AP 102 may then send a trigger frame instructing one or more user devices 120 to collect sounding information. In effect, the AP 102 triggers one or more simultaneous responses from the one or more user devices 120. The AP 102 may then detect and process these responses. In an uplink sounding part, the trigger frame may provide one or more resource allocations for the user devices 120 to send their uplink sounding information. The user devices 120 will then send a known sequence so that the AP 102 can estimate, for example, the time it receives the uplink data with the sounding information from the user devices 120. In a downlink sounding part, the AP 102 will send a known sequence to the user devices 120 in order for them to estimate the time they receive the communication from the AP 102. Following the UL sounding part and the DL sounding part, the AP 102 and the user devices 120 will exchange additional messaging to determine the location of the user devices 120. During the sounding parts, the AP 102 sends the trigger frame and stores in its memory when it sent the trigger frame. When the AP 102 sends a packet in the downlink direction during the downlink sounding part or other parts, the AP 102 stores the time it sends each of these packets. It also records and stores the time it receives a packet from each of the user devices 120. A similar process happens at each user device 120, where the user device 120 would store in its own memory timing information of packets sent and received to and from the AP. It is understood that the above descriptions are for purposes of illustration and are not meant to be limiting.

Figure 6B:
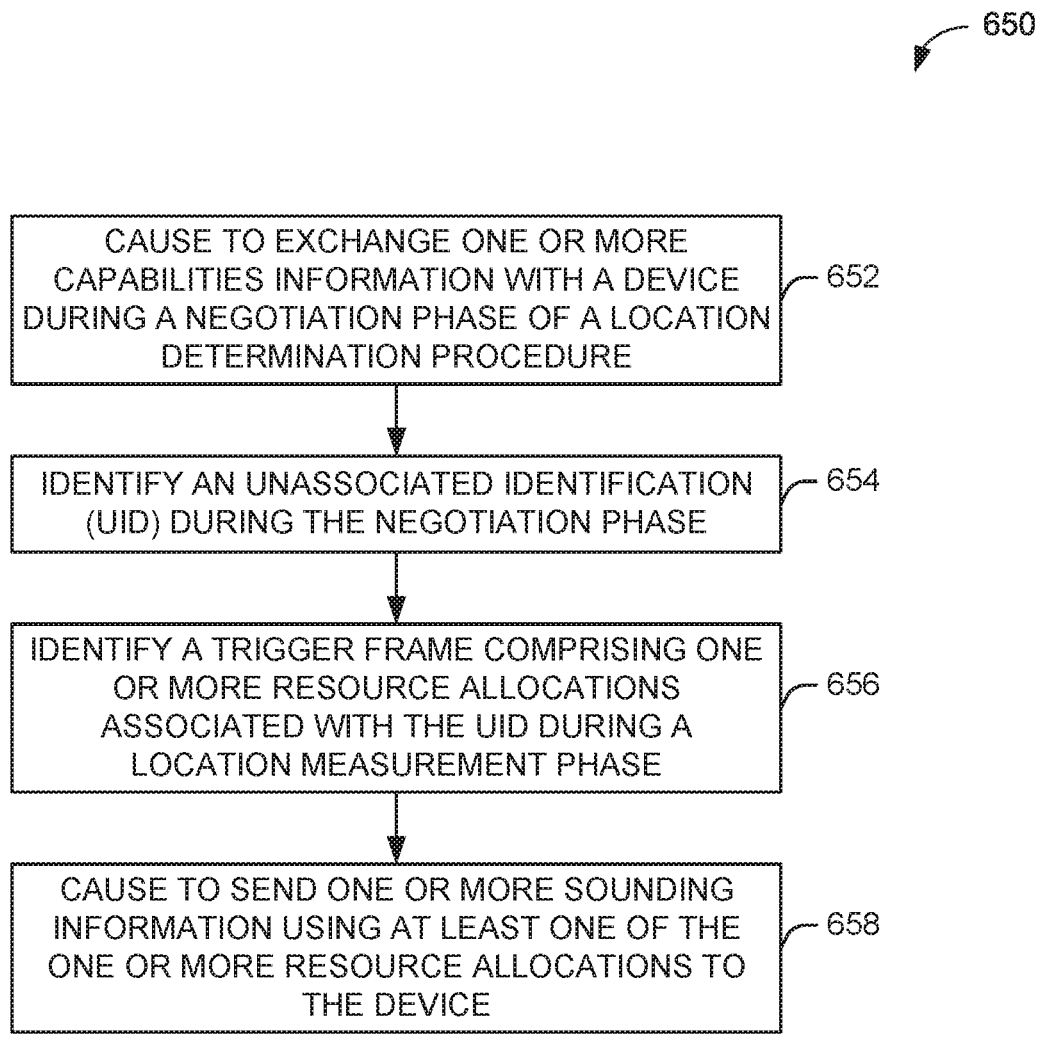
FIG. 6B depicts a flow diagram of an illustrative process for enhanced location determination system, in accordance with one or more example embodiments of the present disclosure.

FIG. 6B illustrates a flow diagram of illustrative process 650 for a high efficiency signal field coding system, in accordance with one or more example embodiments of the present disclosure.

At block 652, a device (e.g., a user device 120 of FIG. 1) may cause to exchange one or more capabilities information with a device during a negotiation phase of a location determination procedure. For example, the AP 102 and one or more user devices 120 of FIG. 1, may participate in a capability exchange phase. The capability exchange may also include a preliminary positioning agreement negotiation between the user devices 120 and AP 102, through exchange of FTM Request and Response frames for instance. The user devices 120 may be associated or unassociated devices with the AP 102. The one or more capabilities information may include a location configuration information (LCI), a number of supported transmit (TX) chains, a number of supported receive (RX) chains, or supported bandwidths. In the case where the one or more user devices 120 are unassociated with the AP 102, two phases for the location negotiation procedure may be defined. The first phase may consist of capability exchange and preliminary positioning agreement negotiation between the unassociated user device 120 and AP 102, through exchange of FTM Request and Response frames for instance. The second phase consists of the positioning measurement phase. This phase consists in actually allowing multiple user devices 120 to perform positioning measurements.

At block 654, the device may identify an unassociated identification (UID) during the negotiation phase. During the first phase, the user device 420 may be allocated a unique UID, and/or a unique short_feedback_allocationID (for short resource request), which is valid for a specific keep-alive timeout duration. For example, an FTM request may be sent from the user device 120 to the AP 102. The AP 102 may respond with an FTM response. The FTM response may include UID and orthogonal allocation ID, which may be used for short resource requests. The UID may be valid for a time duration that may be determined by the AP 102. For example, if the user device 120 does not participate in the measurement phase, a timeout may occur and the UID will be released and reassigned.

At block 656, the device may identify a trigger frame comprising one or more resource allocations associated with the UID during a location measurement phase. A trigger frame may be sent by the AP 102 at a certain time in order to initiate the resource allocations for the location measurements and also may indicate that this will happen at a certain frequency. This may assist the user devices 120 to schedule their wake-up times if necessary. Once an agreement is reached between the user device 120 and the AP 102, then the location measurements may be performed with that AP 102. The same process would then occur between the user device 120 and other APs.

At block 658, the device may cause to send one or more sounding information using at least one of the one or more resource allocations to the device. For example, the AP 102 may then send a trigger frame instructing one or more user devices 120 to collect sounding information. In effect, the AP 102 triggers one or more simultaneous responses from the one or more user devices 120. The AP 102 may then detect and process these responses. In an uplink sounding part, the trigger frame may provide one or more resource allocations for the user devices 120 to send their uplink sounding information. The user devices 120 will then send a known sequence so that the AP 102 can estimate, for example, the time it receives the uplink data with the sounding information from the user devices 120. In a downlink sounding part, the AP 102 will send a known sequence to the user devices 120 in order for them to estimate the time they receive the communication from the AP 102. Following the UL sounding part and the DL sounding part, the AP 102 and the user devices 120 will exchange additional messaging to determine the location of the user devices 120. During the sounding parts, the AP 102 sends the trigger frame and stores in its memory when it sent the trigger frame. When the AP 102 sends a packet in the downlink direction during the downlink sounding part or other parts, the AP 102 stores the time it sends each of these packets. It also records and stores the time it receives a packet from each of the user devices 120. A similar process happens at each user device 120, where the user device 120 would store in its own memory timing information of packets sent and received to and from the AP. It is understood that the above descriptions are for purposes of illustration and are not meant to be limiting FIG. 7 shows a functional diagram of an exemplary communication station 700 in accordance with some embodiments. In one embodiment, FIG. 7 illustrates a functional block diagram of a communication station that may be suitable for use as an AP 102 (FIG. 1) or a user device 120 (FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The communications circuitry 702 may include circuitry that can operate the physical layer (PHY) communications and/or media access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in FIGS. 2, 3, 4, 5A, 5B, 6A and 6B.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device memory.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), a location determination device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The enhanced location determination device 819 may carry out or perform any of the operations and processes (e.g., processes 600 and 650) described and shown above. For example, the enhanced location determination device 819 may facilitate operation under high efficiency multiuser (HE MU) for 802.11az positioning using an enhanced sounding protocol. The enhanced sounding protocol may allow for associated and unassociated devices to be triggered by an AP to perform a location determination. Typically, an STA needs to perform an FTM procedure with three separate APs in order to determine its location using triangulation, trilateration, etc. This type of location determination requires the STA to communicate using a SISO protocol with one AP. That is, the STA has to initiate separate communications with three different APs in order to determine its location.

The enhanced location determination device 819 may facilitate that an AP may take control of the communication medium using a transmit opportunity (TXOP). The AP may then send a trigger frame instructing one or more STAs to collect sounding information. In effect, the AP triggers one or more simultaneous responses from the one or more STAs. The AP may then detect and process these responses. In an uplink sounding part, the trigger frame may provide one or more resource allocations for the STAs to send their uplink sounding information. The STAs will then send a known sequence so that the AP can estimate, for example, the time it receives the uplink data with the sounding information from the STAs. In a downlink sounding part, the AP will send a known sequence to the STAs in order for them to estimate the time they receive the communication from the AP. Following the UL sounding part and the DL sounding part, the AP and the STAs will exchange additional messaging to determine the location of the STAs. During the sounding parts, the AP sends the trigger frame and stores in its memory when it sent the trigger frame. When the AP sends a packet in the downlink direction during the downlink sounding part or other parts, the AP stores the time it sends each of these packets. It also records and stores the time it receives a packet from each of the STAs. A similar process happens at each STA, where the STA would store in its own memory timing information of packets sent and received to and from the AP.

The enhanced location determination device 819 may have a negotiation phase and a location measurement phase. In the negotiation phase, an AP and an STA may exchange of capabilities associated with a location determination.

The enhanced location determination device 819 may facilitate adding a one-time resource assignment and capability exchange phase by: 1) extending a positioning negotiation phase to allow an AP to assign to an STA a unique UID (unassociated ID) and a short feedback allocation ID by extending the legacy FTM request and response process; and 2) enabling the capability as well as location information (LCI) exchange between the user device and the AP, by extending the existing FTM negotiation mechanism.

The enhanced location determination device 819 may provide scheduling information of positioning measurement opportunities from the AP to the STA by 1) indicating using the FTM response the scheduling of the short feedback dedicated for positioning the STA to make its request; 2) using the short feedback trigger frame to indicate future opportunities.

In another embodiment, the enhanced location determination system may add a mechanism for resource release based on a keep-alive method.

The enhanced location determination device 819 may support the use of the short feedback allocation (UID and the orthogonal allocation ID) for the unassociated mode, which is a more efficient allocation method for unscheduled resource allocation. The enhanced location determination device 819 may allow the user device to pick and choose (non-deterministic) from a set of opportunities (short feedback) such that the user device can comply with all of its other scheduling limitations (e.g. due to association, other positioning measurements). Further, the enhanced location determination system does not require signaling for resource release, as the link budget of at least some of the AP that the user device is measuring towards, may not be reliable.

It is understood that the above are only a subset of what the enhanced location determination device 819 may be configured to perform and that other functions included throughout this disclosure may also be performed by the enhanced location determination device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes (e.g., processes 600 and 650) described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, (e.g., a smartphone), a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may have memory and processing circuitry configured to cause to exchange one or more capabilities information with one or more station devices; cause to assign one or more unassociated identifications (UIDs) to one or more unassociated station devices of the one or more station devices to participate in location determination; cause to send a trigger frame comprising at least one of the one or more UIDs, wherein the trigger frame contains one or more resource assignments; and identify one or more sounding information received from at least one of the one or more station devices.

Implementation may include one or more of the following features. The processing circuitry may be further configured to determine a short feedback trigger frame comprising one or more physical layer (PHY) resource allocations, the one or more PHY resource allocations are configured to cause the one or more stations devices to send one or more signals in a form of energy to the device. The processing circuitry is further configured to identify the one or more signals from a first station device; and determine an indication of the one or more signals that the one or more stations devices will participate in multiuser location measurements with the device. The processing circuitry may be further configured to cause to start a first timer associated with assigning a first UID to a first station device; compare the first timer to a UID threshold; determine the first UID has expired based on the first timer being greater or equal to the UID threshold; and cause to assign the first UID to a second station device. The capabilities information may comprise at least one of a location configuration information (LCI), a number of supported transmit (TX) chains, a number of supported receive (RX) chains, supported bandwidths. The processing circuitry may be further configured to cause to assign one or more associated identifications (AIDs) to one or more associated stations devices of the one or more station devices, and wherein the one or more UIDs are different from the one or more AIDs. The one or more UIDs may be assigned during a negotiation phase of a location determination procedure. The one or more resource assignments may be assigned to the one or more station devices to send the one or more sounding information. The processing circuitry may be further configured to determine a second phase of the location determination of the first station device, wherein the second phase includes a positioning measurement phase. The positioning measurement phase may be at least one of a scheduled mode or an unscheduled mode. The scheduled mode may be for the first station device to participate in a specific positioning measurement. The device may further comprise a transceiver configured to transmit and receive wireless signals and one or more antennas coupled to the transceiver.

According to example embodiments of the disclosure, there may be a non-transitory computer-readable medium. The non-transitory computer-readable medium may store computer-executable instructions which, when executed by a processor, may cause the processor to perform operations comprising: causing to exchange one or more capabilities information with a device during a negotiation phase of a location determination procedure; identifying an unassociated identification (UID) during the negotiation phase; identifying a trigger frame comprising one or more resource allocations associated with the UID during a location measurement phase; and causing to send one or more sounding information using at least one of the one or more resource allocations to the device.

Implementation may include one or more of the following features. The operations may further comprise identifying a short feedback trigger frame received prior to the location measurement phase comprising one or more physical layer (PHY) resource allocations, wherein at least one of the one or more PHY resource allocations is associated with the UID. The at least one of the one or more PHY resource allocations may be allocated to send one or more signals in a form of energy to the device. The capabilities information may comprise at least one of a location configuration information (LCI), a number of supported transmit (TX) chains, a number of supported receive (RX) chains, supported bandwidths.

According to example embodiments of the disclosure, there may be a method. The method may further comprise: causing, by one or more processors, to exchange one or more capabilities information with one or more station devices; causing to assign one or more unassociated identifications (UIDs) to one or more unassociated station devices of the one or more station devices to participate in location determination of the one or more unassociated station devices; causing to send a trigger frame comprising at least one of the one or more UIDs, wherein the trigger frame contains one or more resource assignments; and identifying one or more sounding information from at least one of the one or more station devices.

Implementation may include one or more of the following features. The method may comprise determining a short feedback trigger frame comprising one or more physical layer (PHY) resource allocations, the one or more PHY resource allocations are for the one or more stations devices to send one or more signals in a form of energy. The method may further comprise identifying the one or more signals from a first station device; and determining an indication of the one or more signals that the one or more stations devices will participate in multiuser location measurements. The method may further comprise causing to start a first timer associated with assigning a first UID to a first station device; comparing the first timer to a UID threshold; determining the first UID has expired based on the first timer being greater or equal to the UID threshold; and causing to assign the first UID to a second station device. The capabilities information may comprise at least one of a location configuration information (LCI), a number of supported transmit (TX) chains, a number of supported receive (RX) chains, supported bandwidths. The method may further comprise causing to assign one or more associated identifications (AIDs) to one or more associated stations devices of the one or more station devices, and wherein the one or more UIDs are different from the one or more AIDs. The one or more UIDs may be assigned during a negotiation phase of a location determination procedure. The one or more resource assignments may be assigned to the one or more station devices to send the one or more sounding information. The method may further comprise the positioning measurement phase is at least one of a scheduled mode or an unscheduled mode. The scheduled mode may be for the first station device to participate in a specific positioning measurement.

According to example embodiments of the disclosure, there may be a non-transitory computer-readable medium. The non-transitory computer-readable medium may store computer-executable instructions which, when executed by a processor, may cause the processor to perform operations comprising: causing, by one or more processors, to exchange one or more capabilities information with one or more station devices; causing to assign one or more unassociated identifications (UIDs) to one or more unassociated station devices of the one or more station devices to participate in location determination of the one or more unassociated station devices; causing to send a trigger frame comprising at least one of the one or more UIDs, wherein the trigger frame contains one or more resource assignments; and identifying one or more sounding information from at least one of the one or more station devices.

Implementation may include one or more of the following features. The operations may further comprise determining a short feedback trigger frame comprising one or more physical layer (PHY) resource allocations, the one or more PHY resource allocations are for the one or more stations devices to send one or more signals in a form of energy. The operations may further comprise: identifying the one or more signals from a first station device; and determining an indication of the one or more signals that the one or more stations devices will participate in multiuser location measurements. The operations may further comprise: causing to start a first timer associated with assigning a first UID to a first station device; comparing the first timer to a UID threshold; determining the first UID has expired based on the first timer being greater or equal to the UID threshold; and causing to assign the first UID to a second station device. The capabilities information may comprise at least one of a location configuration information (LCI), a number of supported transmit (TX) chains, a number of supported receive (RX) chains, supported bandwidths. The operations may further comprise causing to assign one or more associated identifications (AIDs) to one or more associated stations devices of the one or more station devices, and wherein the one or more UIDs are different from the one or more AIDs. The one or more UIDs may be assigned during a negotiation phase of a location determination procedure. The one or more resource assignments may be assigned to the one or more station devices to send the one or more sounding information. The operations may further comprise determining a second phase of the location determination of the first station device, wherein the second phase includes a positioning measurement phase. The positioning measurement phase may be at least one of a scheduled mode or an unscheduled mode. The scheduled mode may be for the first station device to participate in a specific positioning measurement.

According to example embodiments of the disclosure, there may be an apparatus. The apparatus may comprise: means for causing, by one or more processors, to exchange one or more capabilities information with one or more station devices; means for causing to assign one or more unassociated identifications (UIDs) to one or more unassociated station devices of the one or more station devices to participate in location determination of the one or more unassociated station devices; means for causing to send a trigger frame comprising at least one of the one or more UIDs, wherein the trigger frame contains one or more resource assignments; and means for identifying one or more sounding information from at least one of the one or more station devices.

Implementation may include one or more of the following features. The apparatus may further comprise means for determining a short feedback trigger frame comprising one or more physical layer (PHY) resource allocations, the one or more PHY resource allocations are for the one or more stations devices to send one or more signals in a form of energy. The apparatus may further comprise means for identifying the one or more signals from a first station device; and means for determining an indication of the one or more signals that the one or more stations devices will participate in multiuser location measurements. The apparatus may further comprise means for causing to start a first timer associated with assigning a first UID to a first station device; means for comparing the first timer to a UID threshold; means for determining the first UID has expired based on the first timer being greater or equal to the UID threshold; and means for causing to assign the first UID to a second station device. The capabilities information may comprise at least one of a location configuration information (LCI), a number of supported transmit (TX) chains, a number of supported receive (RX) chains, supported bandwidths. The device may further comprise means for causing to assign one or more associated identifications (AIDs) to one or more associated stations devices of the one or more station devices, and wherein the one or more UIDs are different from the one or more AIDs. The one or more UIDs may be assigned during a negotiation phase of a location determination procedure. The one or more resource assignments may be assigned to the one or more station devices to send the one or more sounding information. The apparatus may further comprise means for determining a second phase of the location determination of the first station device, wherein the second phase includes a positioning measurement phase. The positioning measurement phase may be at least one of a scheduled mode or an unscheduled mode. The scheduled mode may be for the first station device to participate in a specific positioning measurement.

According to example embodiments of the disclosure, there may be a device. The device may have memory and processing circuitry configured to cause to exchange one or more capabilities information with a device during a negotiation phase of a location determination procedure; identify an unassociated identification (UID) during the negotiation phase; identify a trigger frame comprising one or more resource allocations associated with the UID during a location measurement phase; and cause to send one or more sounding information using at least one of the one or more resource allocations to the device.

Implementation may include one or more of the following features. The processing circuitry may be further configured to identify a short feedback trigger frame received prior to the location measurement phase comprising one or more physical layer (PHY) resource allocations, wherein at least one of the one or more PHY resource allocations is associated with the UID. The at least one of the one or more PHY resource allocations may be allocated to send one or more signals in a form of energy to the device. The capabilities information may comprise at least one of a location configuration information (LCI), a number of supported transmit (TX) chains, a number of supported receive (RX) chains, supported bandwidths. The device may further comprise a transceiver configured to transmit and receive wireless signals and one or more antennas coupled to the transceiver.

According to example embodiments of the disclosure, there may be a method. The method may further comprise causing, by one of more processors, to exchange one or more capabilities information with a device during a negotiation phase of a location determination procedure; identifying an unassociated identification (UID) during the negotiation phase; identifying a trigger frame comprising one or more resource allocations associated with the UID during a location measurement phase; and causing to send one or more sounding information using at least one of the one or more resource allocations to the device.

Implementation may include one or more of the following features. The method may further comprise identifying a short feedback trigger frame received prior to the location measurement phase comprising one or more physical layer (PHY) resource allocations, wherein at least one of the one or more PHY resource allocations is associated with the UID. The at least one of the one or more PHY resource allocations may be allocated to send one or more signals in a form of energy to the device. The capabilities information may comprise at least one of a location configuration information (LCI), a number of supported transmit (TX) chains, a number of supported receive (RX) chains, supported bandwidths.

According to example embodiments of the disclosure, there may be an apparatus. The apparatus may comprise: means for causing to exchange one or more capabilities information with a device during a negotiation phase of a location determination procedure; means for identifying an unassociated identification (UID) during the negotiation phase; means for identifying a trigger frame comprising one or more resource allocations associated with the UID during a location measurement phase; and means for causing to send one or more sounding information using at least one of the one or more resource allocations to the device.

Implementation may include one or more of the following features. The apparatus may further comprise means for identifying a short feedback trigger frame received prior to the location measurement phase comprising one or more physical layer (PHY) resource allocations, wherein at least one of the one or more PHY resource allocations is associated with the UID. The at least one of the one or more PHY resource allocations may be allocated to send one or more signals in a form of energy to the device. The capabilities information may comprise at least one of a location configuration information (LCI), a number of supported transmit (TX) chains, a number of supported receive (RX) chains, supported bandwidths.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device for determining wireless positioning of associated and unassociated devices, the device comprising storage coupled to processing circuitry, the processing circuitry configured to:
cause to assign one or more unassociated identifiers to one or more unassociated station devices to participate in a location determination, wherein an unassociated station device is a station device that has not been assigned an association identification (AID), and wherein the one or more unassociated identifiers are assigned during a negotiation with the one or more unassociated station devices;
cause to send a trigger frame comprising at least one of the one or more unassociated identifiers, and one or more resource allocations;
identify a signal received from a first station device of the one or more unassociated station devices; and
cause to send measurement data associated with the first station device.

2. The device of claim 1, wherein the signal is received based on the one or more resource allocations.

3. The device of claim 1, wherein the processing circuitry is further configured to cause to assign one or more associated identifiers to one or more associated station devices.

4. The device of claim 3, wherein the processing circuitry is further configured to identify a second signal received from a second station device, the second station device being one of the one or more associated station devices.

5. The device of claim 4, wherein the processing circuitry is further configured to cause to send measurement data associated with the second station device.

6. The device of claim 3, wherein the one or more associated identifiers are assigned during a negotiation with the one or more associated station devices.

7. The device of claim 1, wherein the one or more resource allocations are associated with a sounding operation, and wherein the measurement data is associated with the sounding operation.

8. The device of claim 1, further comprising a transceiver configured to determine, during the negotiation, a scheduled time for a ranging operation associated with the measurement data.

9. The device of claim 1, further comprising a transceiver configured to transmit and receive wireless signals, the wireless signals comprising at least one of the trigger frame, the signal, or the measurement data.

10. The device of claim 9, further comprising one or more antennas coupled to the transceiver.

11. A non-transitory computer-readable medium storing computer-executable instructions which when executed by one or more processors or an unassociated station device result in performing operations comprising:
identifying, at a first device, an unassociated identifier received from a second device during a negotiation, wherein the first device is a station device that has not been assigned an association identification (AID) and has not associated with the second device;
identifying a trigger frame received from the second device, the trigger frame comprising the unassociated identifier and a resource allocation associated with the unassociated identifier;
causing to send, responsive to the trigger frame a signal to the second device; and
identifying measurement data received from the second device, the measurement data associated with the first device.

12. The non-transitory computer-readable medium of claim 11, wherein the signal is sent based on the resource allocation.

13. The non-transitory computer-readable medium of claim 11, wherein the trigger frame further comprises an associated identifier assigned to a third device associated with the second device.

14. The non-transitory computer-readable medium of claim 11, wherein the resource allocation is associated with a sounding operation, and wherein the measurement data is associated with the sounding operation.

15. A method comprising:
causing to assign, by processing circuitry of a first device, one or more unassociated identifiers to one or more unassociated station devices to participate in a location determination, wherein an unassociated station device is a station device that has not been assigned an association identification (AID), and wherein the one or more unassociated identifiers are assigned during a negotiation with the one or more unassociated station devices;
causing to send, by the processing circuitry, a trigger frame comprising at least one of the one or more unassociated identifiers, wherein the trigger frame contains one or more resource allocations;
identifying, by the processing circuitry, a signal received from a first station device of the one or more unassociated station devices; and
causing to send, by the processing circuitry, measurement data associated with the first station device.

16. The method of claim 15, wherein the signal is received based on the one or more resource allocations.

17. The method of claim 15, further comprising causing to assign one or more associated identifiers to one or more associated station devices.

18. The method of claim 17, further comprising identifying a second signal received from a second station device, the second station device being one of the one or more associated station devices.

19. The method of claim 18, further comprising causing to send measurement data associated with the second station device.

20. The method of claim 17, wherein the one or more associated identifiers are assigned during a negotiation with the one or more associated station devices.

* * * * *